Apr. 17, 1923. 1,451,715

A. B. SEPPMANN

VALVE CAGE VISE AND SPRING REMOVER

Filed May 5, 1921

Inventor
A. B. Seppmann
By D. Swift
Attorney

Patented Apr. 17, 1923.

1,451,715

UNITED STATES PATENT OFFICE.

ALFRED BRUNO SEPPMANN, OF LAKE CRYSTAL, MINNESOTA.

VALVE CAGE VISE AND SPRING REMOVER.

Application filed May 5, 1921. Serial No. 467,164.

*To all whom it may concern:*

Be it known that I, ALFRED BRUNO SEPPMANN, a citizen of the United States, residing at Lake Crystal, in the county of Blue Earth, State of Minnesota, have invented a new and useful Valve Cage Vise and Spring Remover; and I do hereby declare the following to be a full, clear, and exact description of the invention, such as will enable others skilled in the art to which it appertains to make and use the same.

The invention relates to valve spring compressors and holders and has for its object to provide a device of this character particularly adapted for compressing valve springs carried by valve stems, which valve stems and the valves are carried by valve cages of the type used in internal combustion engines.

A further object is to provide a valve cage holder and valve spring compressor comprising a pair of pivoted arms pivoted together at one of their ends, the free ends of said arms being adapted to receive the valve cage and spring therebetween and compress said spring on the rotation of a screw extending through the arms. Also to provide a valve spring compressor and holder so constructed that it will hold various sizes of valves and cages.

With the above and other objects in view the invention resides in the combination and arrangement of parts as hereinafter set forth shown in the drawings, described and claimed, it being understood that changes in the precise embodiment of the invention may be made within the scope of what is claimed without departing from the spirit of the invention.

In the drawings:—

Figure 1:
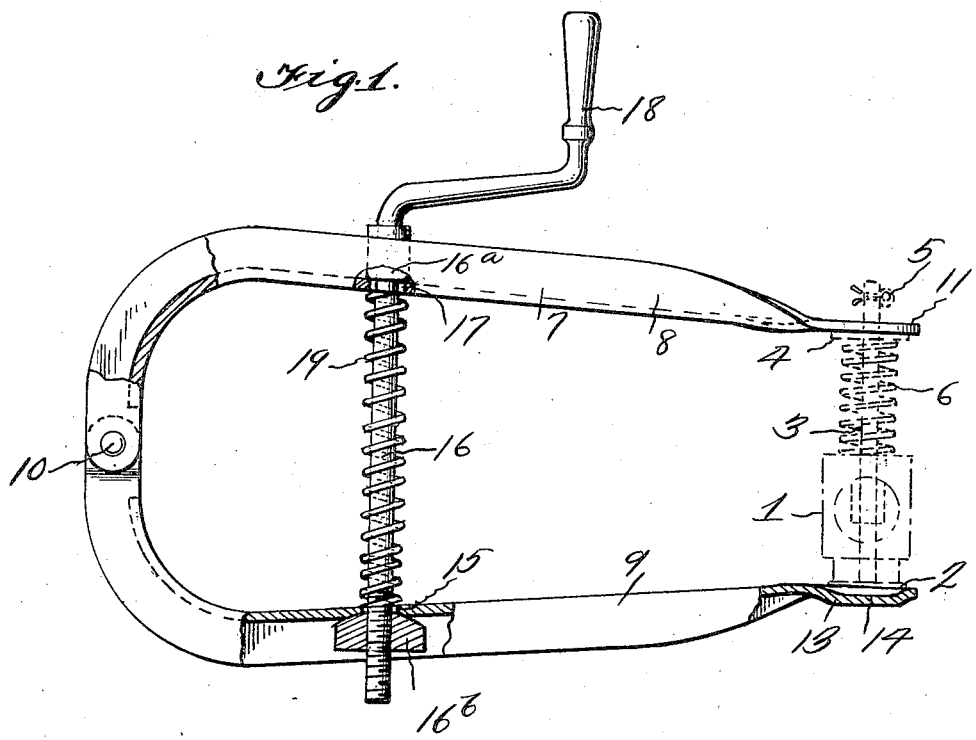
Figure 1 is a side elevation of the compressor and holder, parts being broken away to better illustrate the structure.
Figure 2:
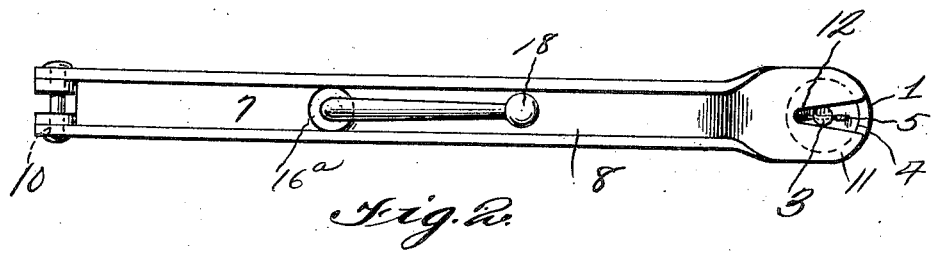
Figure 2 is a top plan view of the device.
Figure 3:
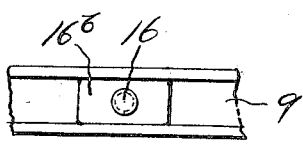
Figure 3 is a bottom plan view of a portion of the lower arm showing a nut through which the operating screw threads.

Referring to the drawings, the numeral 1 designates a conventional form of valve cage and 2 the valve carried thereby. The valve 2 is of a conventional form and is provided with a valve stem 3, which valve stem has slidably mounted thereon a washer 4. The washer 4 is held on the stem 3 by a cotter pin 5 and interposed between the washer 4 and the upper end of the valve cage 1 is a coiled spring 6, by means of which spring the valve 2 is normally maintained closed. The valve cage and valve is a conventional one at present in use and it has been found extremely difficult to compress the spring 6 for removing the cotter pin 5; therefore, to overcome this disadvantage a clamp 7 is provided. The clamp 7 comprises spaced arms 8 and 9, which arms are preferably formed from channel iron and have their rear ends extending inwardly towards each other and pivotally connected as at 10. The forward end of the arm 8 terminates in a horizontally disposed portion 11, which portion engages the upper surface of the washer 4 and receives within the V-shaped recess 12 the valve stem 3. By forming the recess V-shaped, it will be seen that various sizes of valve stems may be received therein. The outer end of the arm 9 terminates in a horizontally disposed portion 13, which portion is preferably provided with a depression 14 in which the valve cage rests. It will be seen that by positioning the cotter pin 5 in the position shown in Figures 1 and 2 that the horizontal portion 11 of the arm 8 may be placed in engagement with the upper surface of the washer 4 and when in such position and with the lower end of the valve cage 1 in the recess 14 of the arm 9 that when the arms 8 and 9 are forced towards each other, the valve spring 6 will be compressed, thereby allowing the cotter pin 5 to be removed, and the cage, valve, and spring to be held for grinding or other purposes.

Extending through an aperture 15 in the arm 9 is an upwardly extending threaded shaft 16, which shaft has its upper end in an enlarged aperture 17 in the arm 8 and terminates in a crank handle 18, there being an enlargement 16ª for engaging the upper face of the arm 8. Threaded on the lower end of the shaft 16 is a rectangular shaped nut 16ᵇ which is disposed between the flanges of the arm 9 and through which nut the shaft threads as the arms 8 and 9 are adjusted in relation to each other. It will be seen that when the handle 18 is rotated that the arms 8 and 9 may be forced towards each other, or allowed to move away from each other under the influence of the coiled spring 19 which surrounds the shaft 16 and is interposed between the arms 8 and 9.

From the above it will be seen that a valve spring compressor and valve cage holder is provided which compressor and holder is simple in operation, light, and so constructed that it may be easily and quickly applied to a valve spring and cage in such a manner that the valve and cage will be positively held.

The invention having been set forth what is claimed as new and useful is:—

A valve spring compressor comprising a pair of pivoted arms pivotally connected together at one of their ends, said arms being provided with outwardly extending spaced reinforcing flanges, the ends of said arms terminating in horizontally disposed portions, between which portions a valve cage having a valve spring may be disposed, a shaft extending through one of said arms between its flanges, said shaft being threaded through a rectangular shaped nut disposed between the flanges of the other arm, said flanges engaging the opposite sides of the nut and holding it against rotation, a coiled spring surrounding said shaft and normally forcing the arms apart, and a crank carried by said shaft whereby the same may be rotated for adjusting the arms in relation to each other.

In testimony whereof I have signed my name to this specification in the presence of two subscribing witnesses.

ALFRED BRUNO SEPPMANN.

Witnesses:
  T. K. MURPHY,
  A. E. QUIMBY.